(12) United States Patent
Reitmann et al.

(10) Patent No.: US 7,941,139 B2
(45) Date of Patent: May 10, 2011

(54) METHOD AND APPARATUS FOR THE TRANSMISSION OF DATA

(75) Inventors: Jörg Reitmann, Harsefeld (DE); Joachim Reuter, Hamburg (DE); Wolfgang Fischer, Jork (DE); Thomas Krebs, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 944 days.

(21) Appl. No.: 11/772,571

(22) Filed: Jul. 2, 2007

(65) Prior Publication Data
US 2008/0122273 A1 May 29, 2008

(30) Foreign Application Priority Data
Jul. 5, 2006 (DE) .......................... 10 2006 031 010

(51) Int. Cl.
*H04W 4/00* (2009.01)
(52) U.S. Cl. ..................... 455/431; 455/569.2; 455/73

(58) Field of Classification Search .................. 455/427, 455/431, 569.2, 73, 575.7, 562.1
See application file for complete search history.

(56) References Cited

U.S. PATENT DOCUMENTS

| 6,614,126 B1 | 9/2003 | Mitchell | ........................ 307/9.1 |
| 7,565,143 B2 * | 7/2009 | Takeuchi et al. | .............. 455/431 |
| 2006/0012510 A1 * | 1/2006 | Rowe | .............................. 342/42 |

FOREIGN PATENT DOCUMENTS

| EP | 1 626 536 A2 | 2/2006 |
| WO | WO 2005/120069 | 12/2005 |

* cited by examiner

*Primary Examiner* — Kamran Afshar
(74) *Attorney, Agent, or Firm* — Sunstein Kann Murphy & Timbers LLP

(57) ABSTRACT

The invention provides a method of and an apparatus for transmitting data, in particular in aircraft, with wireless transmitting and receiving units which are operated on an operating frequency of more than 30 GHz and preferably in a frequency range of between 56 GHz and 64 GHz. Adverse health effects on people and signal interference phenomena are reduced and the method and the apparatus allows broadband data transmission independently of spatial configurations.

12 Claims, 2 Drawing Sheets

METHOD AND APPARATUS FOR THE TRANSMISSION OF DATA

CROSS REFERENCE TO RELATED APPLICATION

The present application claims priority from German application serial number 10 2006 031 010.1-35, filed on Jul. 5, 2006, the full disclosure of which is hereby incorporated by reference herein.

TECHNICAL FIELD

The present invention concerns a method of and an apparatus for the transmission of data in a vehicle, in particular in an aircraft.

BACKGROUND OF INVENTION

In order to make their flight as pleasant as possible for passengers in a modern commercial aircraft a very wide range of different electronic entertainment devices are increasingly being used on board the aircraft. Nowadays it is already usual for a screen to be made available to each passenger, irrespective of class, so that the passenger can watch films or play games. Each passenger can tune in to a video program or another use of his or her choice, by means of an operating unit. In addition sound playback is also possible, for example film sound, music programs or the like, by means of a headset or headphones connected to the electronic equipment. The entire spectrum of such functions and applications is referred to as 'in-flight entertainment' (IFE). A further important and similar area of use is communication on the part of passengers by telephone or Internet on board the aircraft. IFE uses require the transmission of video or audio data from one or more central server units in the fuselage of the aircraft (hereinafter also referred to by the term 'computing units') to a respective electronic system connected to the screens and other reproduction or input devices.

The predominant situation provides that the video and audio programs are transmitted synchronously only at given time intervals and for all passengers (broadcast method) but it is felt to be advantageous for such programs to be played on an individual basis (on-demand method). Finally in its entirety a modern in-flight entertainment system in a relatively large passenger aircraft results in a very large amount of data and therefore requires data lines which can implement broadband transmission of video and audio data or the like to a large number of passenger seats.

In addition to the required data line bandwidth to the passenger seats the cabin of a modern commercial aircraft must afford the option of rapid reorganisation in order to completely re-configure it during a short stay between two flights. Re-configuration for example involves re-arranging the passenger seats from a three-class layout to a purely economy layout. For that purpose, it is necessary to move, introduce and remove seat positions which are fixed to the cabin floor in seat rails which are let thereinto. Therefore removing and fitting a passenger seat in the cabin always requires a data line connection to be disconnected and restored.

As an alternative, wireless transmission from the computer unit to the individual passenger seats by means of conventional wireless network devices involving transmission frequencies of 2.4 or 5 GHz (IEEE 802.11a, 802.11b, 801.11 g etc) is admittedly possible, but to achieve the necessary data bandwidth it would be necessary to have a large number of network access points which, by virtue of the necessary, comparatively high transmission power, result in a high level of radiation loading. It is also not out of the question that devices which passengers have brought into the aircraft cabin and which operate on those or adjacent frequencies are switched on by mistake during the flight and interfere with the wireless network. There is also some dispute as to whether the radiation from access points is harmless to people.

Therefore the object of the present invention is to reduce or eliminate one or more of the specified disadvantages. In particular the object of the present invention is to provide a possible way of implementing robust flexible data transmission in a vehicle, in particular in an aircraft.

The object of the invention is attained by a method of transmitting data in a vehicle, wherein a computing unit passes data to a plurality of transmitting and receiving units, wherein the wireless transmitting and receiving units alternately communicate with at least one electronic device having a transceiver unit, and wherein the transmitting and receiving units and the transceiver unit are operated at an operating frequency of more than 30 GHz.

Using wireless transmitting and receiving units for sending data to electronic devices is advantageous as the fixed wiring of an electronic device is eliminated and spatial re-positioning thereof involves a lesser degree of complication and expenditure. A transceiver unit is to be interpreted as being a network device which can wirelessly communicate alternately with a transmitting and receiving unit. In order to achieve higher bandwidths or to service a plurality of electronic devices further wireless transmitting and receiving units can be connected at any time to the data-carrying unit. Network coverage can be optimised by individually distributing wireless transmitting and receiving units. By virtue of using an operating frequency which is markedly above that of conventional wireless access points, it is possible to exclude interference due to for example portable computers with integrated wireless network functionality. Admittedly the range of the signal falls due to a great increase in frequency but the attainable bandwidth in the transmission mode rises. The result of this is that broadband data transmissions can be implemented with wireless transmitting and receiving units involving an operating frequency of more than 30 GHz over short distances with a low level of electrical power consumption and as a result a low level of radiation intensity.

It is possible for example for the ceiling of a cabin of an aircraft to be equipped over a large area with such wireless transmitting and receiving units which can each only reach passenger seats in their relatively close proximity. In spatial terms the levels of radiation concentration are lower than when using conventional wireless network access points with a higher radiation power with a comparable bandwidth but a greater range. The adverse effect on the health of people in the immediate proximity of the transmitting and receiving units is reduced as a result.

It is particularly advantageous to use an operating frequency in the range of between 56 GHz and 64 GHz. At the present time that represents a possible optimum in regard to manufacturing costs, bandwidth provided and structural size. When using an operating frequency from that range it is possible to embody very compact electronic components in which the transmitter, the transmission amplifier and further peripherals are arranged on a single silicon chip.

In a particularly preferred feature a respective electronic device is associated with each transmitting and receiving unit. Thus the transmission power of each transmitting and receiving unit can be minimised by restricting the bandwidth to be transmitted and the distance to be bridged over.

In a further preferred feature a group of a plurality of electronic devices is associated with a transmitting and receiving unit and the electronic devices communicate alternately with the transmitting and receiving unit using different channels. That results in a reduction in the number of transmitting and receiving units to be provided and reduces costs.

In an advantageous embodiment the transmitting and receiving units and the at least one electronic device are further connected to antennae and/or have antennae which are adapted to multi-path emission. In that way an individual antenna can receive data streams from a plurality of spatial directions or emit same and thereby improve the communication properties.

It is preferred for the electronic device to be integrated into a seat or into a group of seats. In that way it is possible for example for data for entertainment programs to be transmitted within the vehicle to devices which are associated with an individual seat or passenger and connected to screens and the like. That means that an electronic device can be associated with each passenger or each small group of passengers in order to simplify data transmission and to provide capacities for the conversion of received data into reproducible signal formats. Furthermore arranging the electronic device in or on the seat is a structure which saves space and which does not have an adverse effect either on the amount of space available for passengers or gangways.

Arranging the antenna of the electronic device at the top of a backrest of the seat is desirable as in that way the distance to be covered between a transmitting and receiving unit at the ceiling of the vehicle is minimised and reception of the data signals can be improved.

Equally arranging the antenna of the electronic device at the underside of a backrest of the seat is advantageous as the distance to be covered between an antenna of a transmitting and receiving unit arranged for example at the floor of the vehicle is reduced.

It is moreover advantageous for the antenna of the transmitting and receiving units to be arranged above the transceiver units, in particular at the ceiling of the vehicle. That can provide for accurate alignment of the antennae with the antennae of the electronic devices in order in that way to enhance the quality of transmission.

Furthermore it is desirable for the antenna of the transmitting and receiving units to be arranged beneath the transceiver units, in particular at the floor of the vehicle. In combination with antennae of transceiver units, which are arranged closely above the floor of the vehicle, the distance to be covered can be further minimised.

The object of the invention is further attained by a system for transmitting data in a vehicle, comprising a plurality of wireless transmitting and receiving units for transmitting and receiving data, a computing unit for passing data to the transmitting and receiving units, at least one electronic device having a transceiver unit for alternate communication with the wireless transmitting and receiving units, wherein the wireless transmitting and receiving units and the transceiver unit are operated at an operating frequency of more than 30 GHz. The further features and advantages are to be found in the configurations of the method of transmitting data in a vehicle.

The object of the invention is also attained by an electronic device for alternate wireless communication with an associated transmitting and receiving unit for transmitting data in a vehicle, in particular in an aircraft, which are passed by a computing unit to a plurality of transmitting and receiving units, which includes a transceiver unit, wherein the transceiver unit is operated at an operating frequency of more than 30 GHz.

The object of the invention is further attained by a transmitting and receiving unit for alternate wireless communication with at least one electronic device having a transceiver unit for transmitting data in a vehicle, in particular in an aircraft, which are passed by a computing unit to a plurality of transmitting and receiving units, wherein the transmitting and receiving unit is operated at an operating frequency of more than 30 GHz.

BRIEF DESCRIPTION OF THE DRAWINGS

The invention is described in greater detail hereinafter with reference to the drawings in which identical elements are identified by identical references. In the drawing.

DETAILED DESCRIPTION OF SPECIFIC EMBODIMENTS

Figure 1:
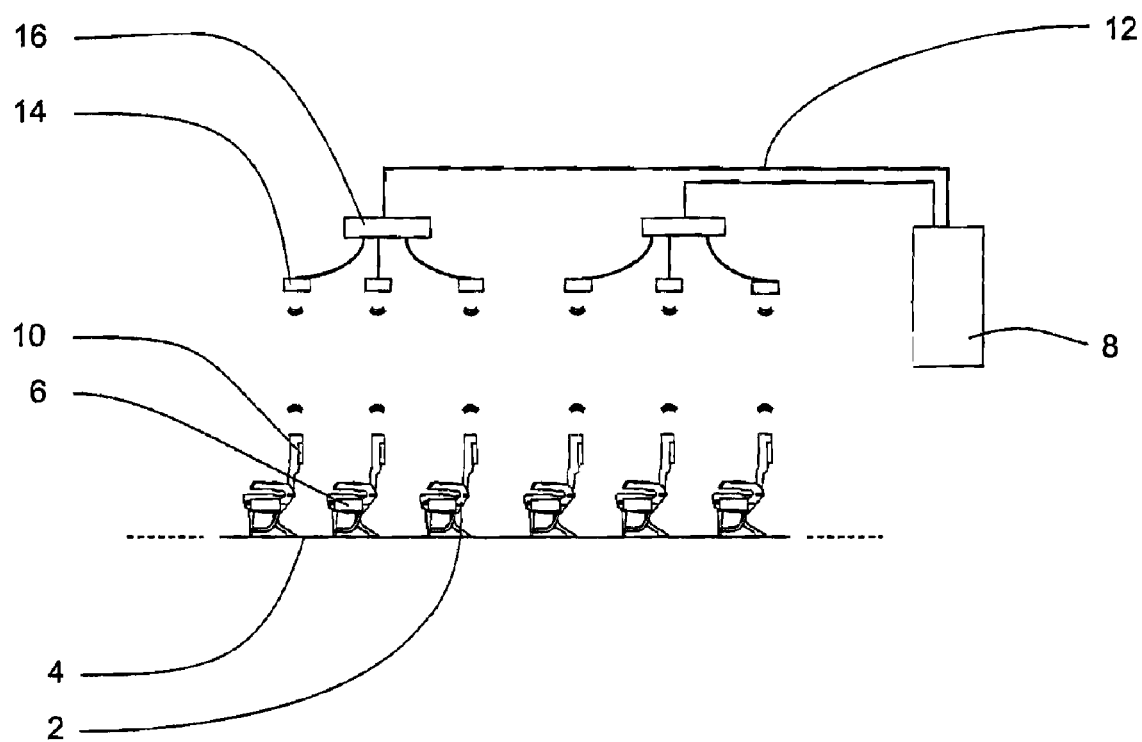
FIG. 1 shows a diagrammatic view of an apparatus according to the invention.

FIG. 1 diagrammatically shows the apparatus according to the invention for transmitting data by way of example by reference to a passenger cabin of an aircraft.

A plurality of passenger seats 2 are arranged on the floor 4 of the cabin and are locked in seat rails (not shown in greater detail) in predetermined positions in dependence on the passenger class in question. In more luxury classes the passenger seats 2 can predominantly be individually positioned and locked in place. In less expensive classes however the usual practice is for a plurality of passenger seats 2 to be combined together to form groups and always jointly placed in the cabin.

Each passenger seat 2 or each group of passenger seats 2 has an electronic device 6 which communicates with a central computing unit 8 in the aircraft and can transmit data. For each passenger seat 2 a screen 10 is connected to an associated electronic device 6 for picture reproduction, with the screen 10 frequently being arranged on the backrest of a passenger seat 2 in frontally adjoining relationship. In addition a headphone connection and an operating device (not shown) are usually provided for each passenger seat 2. The electronic device 6 is equipped in particular for receiving video and audio data of the in-flight entertainment system and converting same into a signal which can be reproduced by the screen 10 and/or a headphones.

In this example the central computing unit 8 is somewhat more specifically a server unit 8 which provides audio and video data for the in-flight entertainment. The audio and video data can be embodied for example in the form of digital film and sound data. Those data are preferably provided in the form of digital data as, by virtue of their properties, they are relatively insensitive to interference, they permit a uniform quality in respect of sound and image and in addition they can be easily stored or exchanged. As an alternative to the continuous transmission of data it is also possible to provide for one-off transmission in conjunction with storage in the electronic devices 6. Conversion into analog or digital formats which can be reproduced for the connected devices is usually effected in the electronic devices. It is possible to envisage further kinds of data which for instance represent moving maps to provide positional information or also make it possible to execute games programs for entertainment purposes.

For the transmission of data from the server unit 8 to the electronic devices 6 the server unit 8 is connected by way of lines 12 to wireless transmitting and receiving units 14. The transmitting and receiving units 14 are comparable to very compact wireless access points. The operating frequency used in the apparatus of the present invention is more than 30 GHz and is preferably in a range of between 56 GHz and 64 GHz.

A suitable network device (hereinafter also referred to as a 'transceiver') is required for each electronic device 6, for receiving the data radiated by the transmitting and receiving units 14. The electronic devices 6 can wirelessly communicate with the transmitting and receiving units 14 and thus with the server unit 8 by means of a network device. Preferably the passenger seats 2 are equipped with the electronic devices 6 in such a way that an exclusive transmitting and receiving unit 14 is associated with each electronic device 6 so that each passenger seat 2 or each group of passenger seats 2 has a transmitting and receiving unit 14 at an immediate (viewing) distance.

The use of that operating frequency affords a greater bandwidth with a markedly lower level of power consumption than in the case of conventional WLAN technology (IEEE 802.11a, 802.11b, 802.11g). The oxygen absorption rate which is high at that frequency means that a great attenuation effect occurs and the range of the radiated signal falls into the range of a few meters. Therefore to achieve optimum network coverage in the passenger cabin a large number of transmitting and receiving units 14 is required, which are preferably arranged over a large area at the ceiling of the passenger cabin. The low level of radiation power which is reflected in the low power consumption consequently results in a markedly lower level of local radiation loading in the immediate proximity of a transmitting and receiving unit 14 and thus also results in a markedly lower level of stress in terms of the health of the passengers due to the consequences of radiation. Alternatively the transmitting and receiving units 14 can also be arranged over a large area in the floor region whereby the distance to be covered can be shortened and interference due to objects and people can be reduced.

By virtue of the required number of wireless transmitting and receiving units 14 and the number connected thereto of connecting lines, it is appropriate for a plurality of transmitting and receiving units 14 to be combined together in respect of position, by the units 14 being connected in star configuration to a common distributor 16 (network switch or the like). The distributors 16 of a plurality of groups of transmitting and receiving units are also connected in star configuration to the server unit 8 by way of a respective single line 12.

The use of transmitting and receiving units 14 involving an operating frequency of about 60 GHz means that the wavelengths which occur are quite low. The required size of the transmitting antenna used is consequently also small. Accordingly it is easily possible for small flat antennae to be connected to the electronic devices 6 and integrated into the passenger seats 2. It is possible for antennae to be sewn, welded or inserted into the cushioning upholstery of the backrest of the passenger seats 2. Preferably the antennae are respectively arranged at the top of the backrest of the passenger seat 2 in order to minimise the distance to be covered, to the associated transmitting and receiving unit 14. Arranging a receiving antenna on the top side of the backrest of a passenger seat additionally reduces the probability of the received signal being shadowed or masked by mistake. Those measures provide that the necessary transmission power and thus the radiation loading can be greatly restricted.

A possible expansion of the apparatus according to the invention provides that the capacity of the transmitting and receiving units 14 used can be additionally increased by utilising multi-path propagation properties of the emitted signals. By way of example for that purpose the transmitting and receiving units 14 are equipped with antennae which can emit various data streams at the same frequency but in different directions. By virtue of signals being reflected at the metal outer skin of the aircraft alternative propagation paths in respect of the emitted signals to the antennae of the passenger seats can be afforded and used. In addition frequencies can be re-used within the aircraft cabin in sufficiently mutually spaced regions by virtue of the restricted range which is markedly less than a usual aircraft cabin length.

Figure 2:
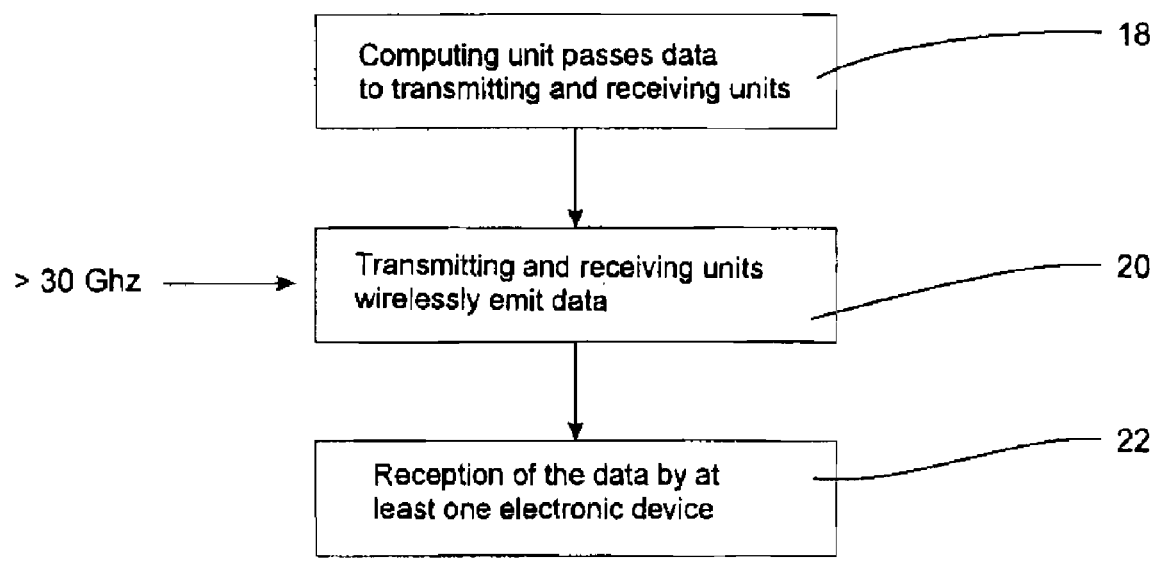
FIG. 2 shows a method according to the invention in the form of a block circuit diagram.

FIG. 2 shows the method according to the present invention. Firstly a computing unit passes data to a plurality of transmitting and receiving units 14 (method step identified by reference 18 in FIG. 2). The transmitting and receiving units 14 now emit the data (20) which are received (22) by at least one electronic device 6. Transmission and reception of the data are effected using a frequency which is above 30 GHz and preferably in a range of between 56 GHz and 64 GHz.

The present invention provides a method of and an apparatus for the transmission of data, in particular in aircraft, which is distinguished by a number of advantageous features. The use of a wireless data transmission method eliminates the need to produce wired data connections. Particularly in passenger cabins of a modern commercial aircraft wired data transmission would be contrary to the requirement for rapid re-configuratability of the seating arrangement. Wireless data transmission with conventional and wide-spread devices in accordance with the IEEE 802.11a, 802.11b or 802.11g standard would lead to increased radiation loading on the passengers. The use of transmitting and receiving units which are operated at a substantially higher frequency, for example 60 GHz, require less electrical power, they reduce the radiation loading on the passengers and at the same time they afford a great bandwidth for data transmission. The present invention is not limited to transmitting and receiving units operating at 60 GHz, it is possible to use any transmitting and receiving units which use a frequency of the same order of magnitude or substantially higher.

What is claimed is:

1. A method of transmitting data in a vehicle, in particular in an aircraft, wherein a computing unit passes data to a plurality of transmitting and receiving units, wherein the transmitting and receiving units alternately wirelessly communicate with at least one electronic device having a transceiver unit, wherein a plurality of distributors are each connected by way of a respective single line to the computing unit thereby forming a star configuration, wherein the transmitting and receiving units are combined together in groups, each group of transmitting n connected in star configuration to one of the distributors, and wherein the transmitting and receiving units and the transceiver unit are operated at an operating frequency of more than 30 GHz.

2. A method as set forth in claim 1, wherein the transmitting and receiving units and the transceiver unit are operated at an operating frequency in the range of between 56 GHz and 64 GHz.

3. A method as set forth in claim 1, wherein a respective electronic device and a respective transmitting and receiving unit communicate exclusively alternately with each other.

4. A method as set forth in claim 1, wherein a group of a plurality of electronic devices is respectively associated with a transmitting and receiving unit and the electronic devices alternately communicate with the associated transmitting and receiving unit using different channels.

5. A method as set forth in claim 1, wherein the transmitting and receiving unit and the at least one electronic device have antennae and/or are connected to antennae and wherein the antennae are adapted for multi-path radiation.

6. A method as set forth in claim 1, wherein the electronic device is integrated into a seat or into a group of seats.

7. A method as set forth in claim 6, wherein the antenna of the electronic device is arranged at the top of a backrest of the seat.

8. A method as set forth in claim 6, wherein the antenna of the electronic device is arranged at the underside of a backrest of the seat.

9. A method as set forth in claim 1, wherein the antennae of the transmitting and receiving units are arranged above the transceiver units, in particular at the vehicle ceiling.

10. A method as set forth in claim 1, wherein the antennae of the transmitting and receiving units are arranged beneath the transceiver units, in particular at the vehicle floor.

11. A system for transmitting data in a vehicle, in particular in an aircraft, comprising a plurality of wireless transmitting and receiving units for transmitting and receiving data, a computing unit for passing data to the transmitting and receiving units, at least one electronic device having a transceiver unit for alternate communication with the wireless transmitting and receiving units, a plurality of distributors each connected by way of a respective single line to the computing unit thereby forming a star configuration, wherein the transmitting and receiving units are combined together in groups, each group of transmitting n connected in star configuration to one of the distributors, wherein the transmitting and receiving units and the transceiver unit are operated at an operating frequency of more than 30 GHz.

12. A vehicle, in particular an aircraft, comprising a system for transmitting data in the vehicle, the system comprising a plurality of wireless transmitting and receiving units for transmitting and receiving data, a computing unit for passing data to the transmitting and receiving units, at least one electronic device having a transceiver unit for alternate communication with the wireless transmitting and receiving units, a plurality of distributors each connected by way of a respective single line to the computing unit thereby forming a star configuration, wherein the transmitting and receiving units are combined together in groups, each group of transmitting and receiving units being connected in star configuration to one of the distributors, wherein the transmitting and receiving units and the transceiver unit are operated at an operating frequency of more than 30 GHz.

\* \* \* \* \*